F. J. MEDWAY.
SECTIONAL CONDUIT.
APPLICATION FILED OCT. 18, 1915.
1,184,472.
Patented May 23, 1916.
2 SHEETS—SHEET 1.
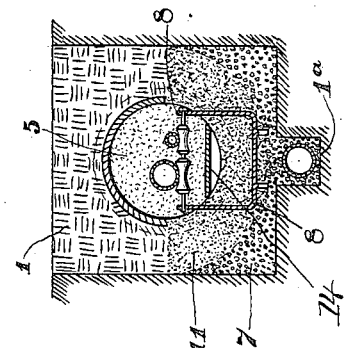
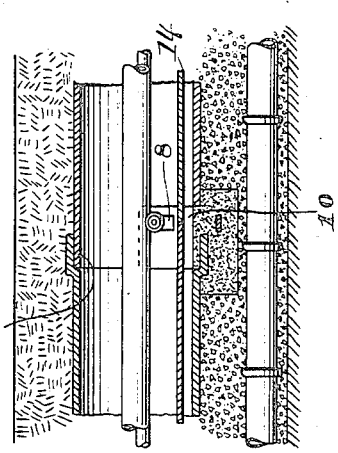
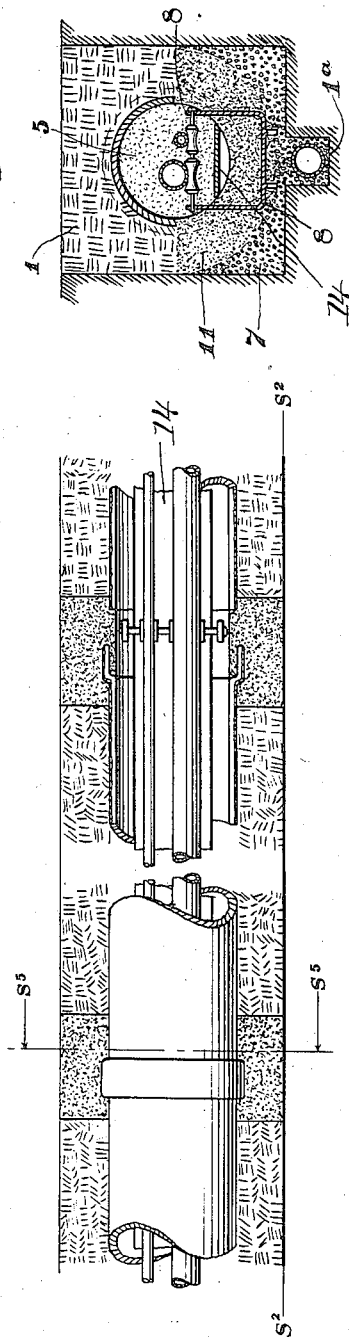
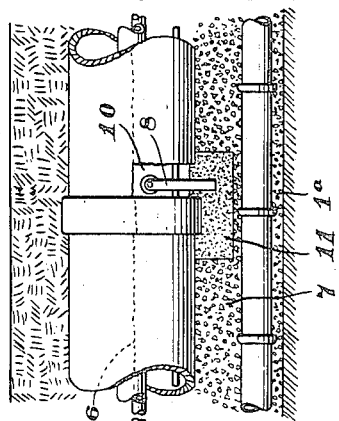
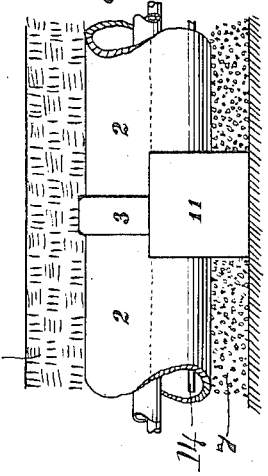
Inventor
Fred John Medway
By his Attorney

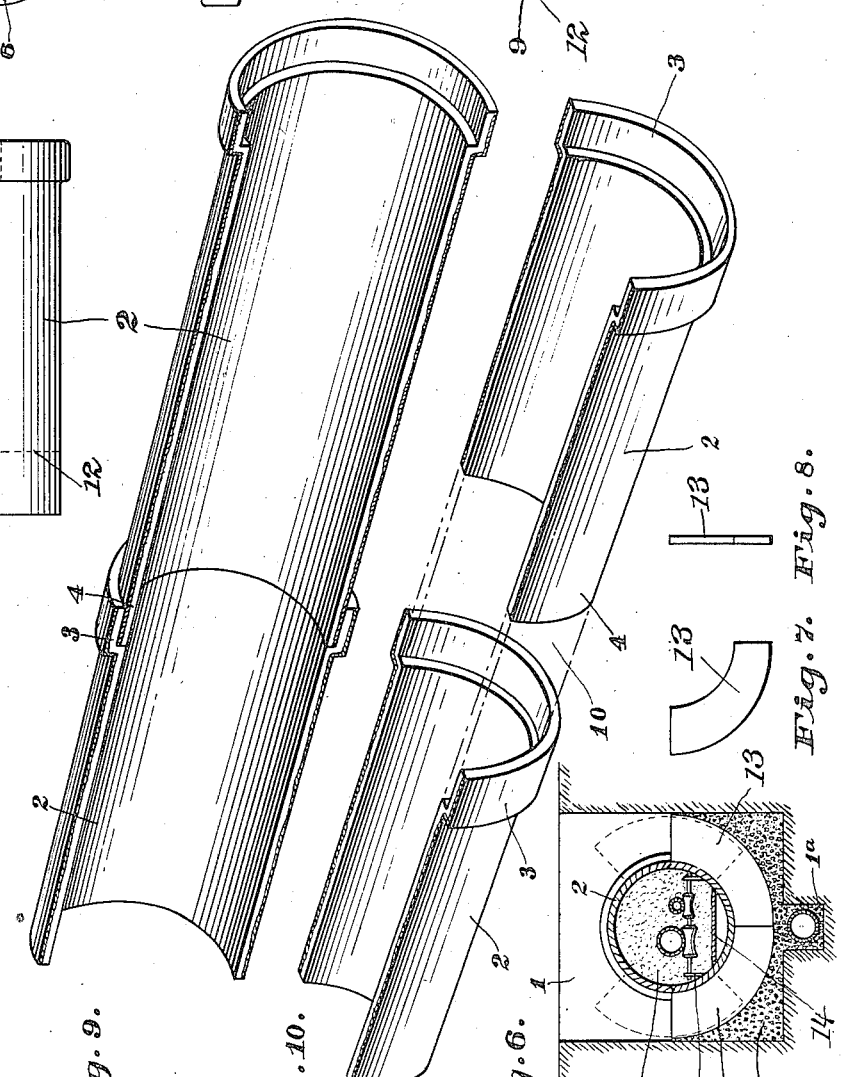

UNITED STATES PATENT OFFICE.

FRED JOHN MEDWAY, OF WEEHAWKEN, NEW JERSEY, ASSIGNOR TO H. W. JOHNS-MANVILLE COMPANY, A CORPORATION OF NEW YORK.

SECTIONAL CONDUIT.

1,184,472.

Specification of Letters Patent.

Patented May 23, 1916.

Application filed October 18, 1915. Serial No. 56,582.

*To all whom it may concern:*

Be it known that I, FRED JOHN MEDWAY, a citizen of the United States of America, residing at Weehawken, county of Hudson, State of New Jersey, have invented certain new and useful Improvements in Sectional Conduits, of which the following is a specification.

My invention relates generally to underground steam conduits of the character illustrated and described in Letters Patent of the United States No. 638,931, granted to Kimball and McKenzie, December 12, 1899 and No. 1,149,920, granted to Kimball, Aug. 10, 1915.

The invention is directed specifically to certain improvements in the construction and arrangement of supports for the conduit and the piping within the same.

In the Kimball and McKenzie patent referred to, a form of support is disclosed which consists in making every third, fourth or fifth section of the conduit of T-form and utilizing the vertical leg of the T as a supporting pedestal which rests on the bottom of the trench and is bedded in and partly filled with concrete. Roll carriers for the steam pipes within the conduit, are set in the cement filling of the vertical leg of the T-sections and to facilitate accurate placing of these roll-carriers and the setting up of the T-supports, the conduit sections are constructed so as to be readily separable into halves along lines extending in the direction of their length, permitting the lower half sections of the conduit to be permanently assembled in the trench throughout the entire length of the conduit, if desired, and the steam pipes arranged on the roll carriers therein, before the upper half sections are placed in position, which is the final step in completing the conduit.

The construction above described, while generally satisfactory, is open to serious objection by reason of the time, labor and cost involved in the manufacture and use of the T-sections and it is the object of the present invention to obviate this by dispensing with the use of T's and constructing the supports entirely of concrete, which permits the conduit sections to be manufactured of uniform size and shape and results in a material saving in the cost of manufacture and loss through breakage in shipping and laying.

The accompanying drawings will serve to illustrate one form of construction suitable for carrying my invention into effect. I wish it understood, however, that I do not limit myself to showing in these drawings as various changes may be made without departing from the spirit and scope of the present invention.

In the drawings: Figure 1, is a horizontal section through the trench containing the completed conduit, the latter being shown partly in plan and partly in section. Fig. 2, is a vertical section through the trench taken on the line $S^2$, $S^2$ of Fig. 1. Fig. 3, is a similar view taken centrally of the trench, with the conduit shown in elevation. Fig. 4, is a central vertical longitudinal section. Fig. 5, is a cross-section on the line $S^5$, $S^5$, of Fig. 1. Fig. 6, is a similar view, indicating by dotted lines the manner of removing the curved forms after the concrete pedestal is completed. Fig. 7, is a side view of one of the curved forms and Fig. 8, is an edge view thereof. Fig. 9 and Fig. 10 are views in perspective of the separated halves of adjoining conduit sections. Fig. 11, is a view in side elevation of the conduit section in connection with which the concrete supporting pedestal is formed. Fig. 12, is an end view, and Fig. 13, is a view in elevation of the under side thereof.

Referring now to the drawings, the conduit, as ordinarily constructed, is laid under ground in a trench such as is represented at 1, below and centrally of which there is an under drain of vitrified B and S tile, laid open joint.

The conduit is made up of a series of pipe sections 2, shaped to fit one within the other by being provided with a bell, 3, at one end to receive the plain or spigot end 4, of the adjoining section. When thus assembled and laid with cemented joints, there is formed a continuous water and air tight casing suitable for containing one or more lines of piping conveying steam or the like.

In order to reduce to a minimum the transmission of heat to or from the contained gas or liquid, the pipes within the conduit have loosely packed around them asbestos or other non-heat conducting material indicated at 5, which is employed in quantity sufficient to fill the interior of the conduit, as shown.

Usually the conduit sections are longitudinally scored, perforated or otherwise formed, as indicated at 6, to be readily split into halves and in constructing the conduit, the bottom halves are first placed in position in the trench on a bed of gravel or broken stone 7, and the joints cemented to permanently unite the same in assembled relation ready to receive the steam pipes, suitable supporting frames 8, being provided at every third, fourth, fifth or sixth section for carrying rolls for each pipe.

As above pointed out, the present invention is directed mainly to providing a comparatively inexpensive and at the same time efficient and satisfactory mounting for the roll-carrying frames which, in order to meet practical requirements, must be supported independently of the conduit.

In order to accomplish this without employing T's or other special forms differing in shape from the sections which go to make up the body of the conduit, I provide, in the manufacture of certain of the sections, by scoring or perforations, indicated at 9, for the subsequent removal of the end portion of the bottom half so that when the sections are assembled, a series of, preferably equispaced, bottom openings 10, will be formed throughout the length of the conduit, through which the roll-carrying frames project into the same from suitable supports 11, which serve to close the openings. By circumferentially scoring or perforating the bottom half of these sections, as indicated at 12; the end portion thereof, to any required length, may be readily broken off in the same manner and at the same time the section is split into halves, and in setting such a short-length bottom half at a distance from and in such relation to the bell end of an adjoining full length bottom half section, (see Figs. 9 and 10,) that the mating upper half sections will register with the same, a bottom opening of the required dimensions for the accommodation of the roll-carrying frame will be provided, as shown for example, in Fig. 3.

The supports for the roll-carrying frames are preferably given a cradle form to overlap and embrace the adjoining ends of the full and short length lower half sections, as shown in Figs. 3 and 5, and are formed of concrete, being shaped to close the bottom opening in the conduit and conform to the inner curved wall thereof; in effect supplying the missing end portion to the short length bottom half section and restoring it to complete form.

In constructing the support, the necessary space, to a suitable depth and length, about the adjoining ends of the full and short length half sections, may be cleared of gravel, etc., by means of thin metal end plates 13, such as shown (Figs. 6, 7 and 8), and after the roll-carrying frame is temporarily secured in proper relative position (Fig. 3), the concrete is poured in, filling the cleared space and assuming, under proper troweling, the form of a cradle in which the ends of the full and short length lower half sections rest and are supported and by which they are operatively united and made practically continuous.

In conjunction with the conduit, a separate narrow slab of tile or other suitable material 14, so placed in the bottom of the conduit as to provide a slight space throughout the length of the conduit line for the purpose of collecting and discharging at the lower end of the conduit such accumulation of moisture as might result from a leak developing in any of the piping, or from a possible defective joint or break developing in the conduit proper, and admitting water from the exterior. The object of this is to prevent the otherwise confined moisture being absorbed by the pipe insulation, and thus depreciating the insulation value.

The many important advantages of this type of support will be at once apparent. The conduit, throughout its entire length may be made up of sections of uniform shape and size, no special forms being required excepting the terminal sections, which have not been herein previously referred to as they form no part of the present invention.

Having described my invention, I claim:

1. A conduit for containing steam pipes and the like having in combination a series of lengths of pipe arranged end to end and split longitudinally in a horizontal plane, the lower section of certain lengths, having a portion removed at one end, a body of concrete embedded in the earth and covering the opening so formed, and a pipe supporting frame set in said concrete.

2. A conduit for containing steam pipes and the like having in combination a series of lengths of pipe arranged end to end and split longitudinally in a horizontal plane, the lower section of certain lengths having a portion removed at one end, a body of concrete embedded in the earth and covering the opening so formed, and a pipe supporting frame set in said concrete, together with a horizontal plate resting loosely in the bottom section of each pipe length and a body of loose non-heat conducting material, filling the conduit above the plate.

3. A conduit for containing steam pipes and the like comprising in combination a series of tubular sections arranged end to end, a series of horizontal plates resting loosely on the bottom of the tubular sections so as to leave crevices for the flow of liquid between and a body of loose non-heat conducting material filling the conduit above said plates.

FRED JOHN MEDWAY.

Witnesses:
M. K. LOTTERN,
WALTER H. PUMPHREY.